Figure 7:
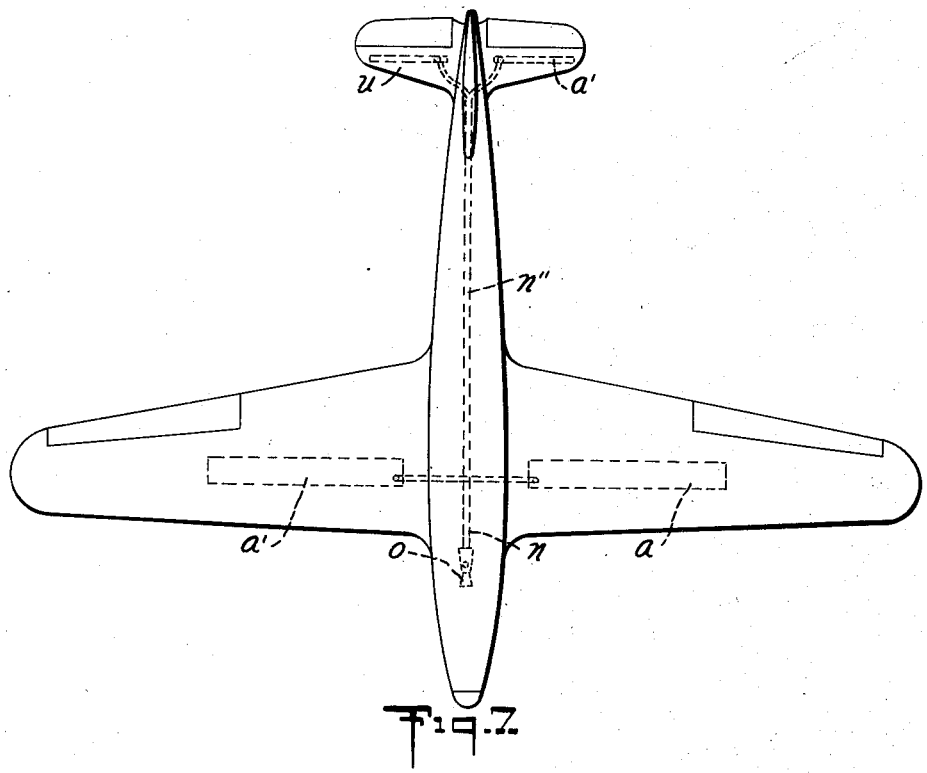

Jan. 8, 1946.  R. T. YOUNGMAN  2,392,443
AIR BRAKE FOR AIRCRAFT
Filed May 11, 1942  3 Sheets-Sheet 1
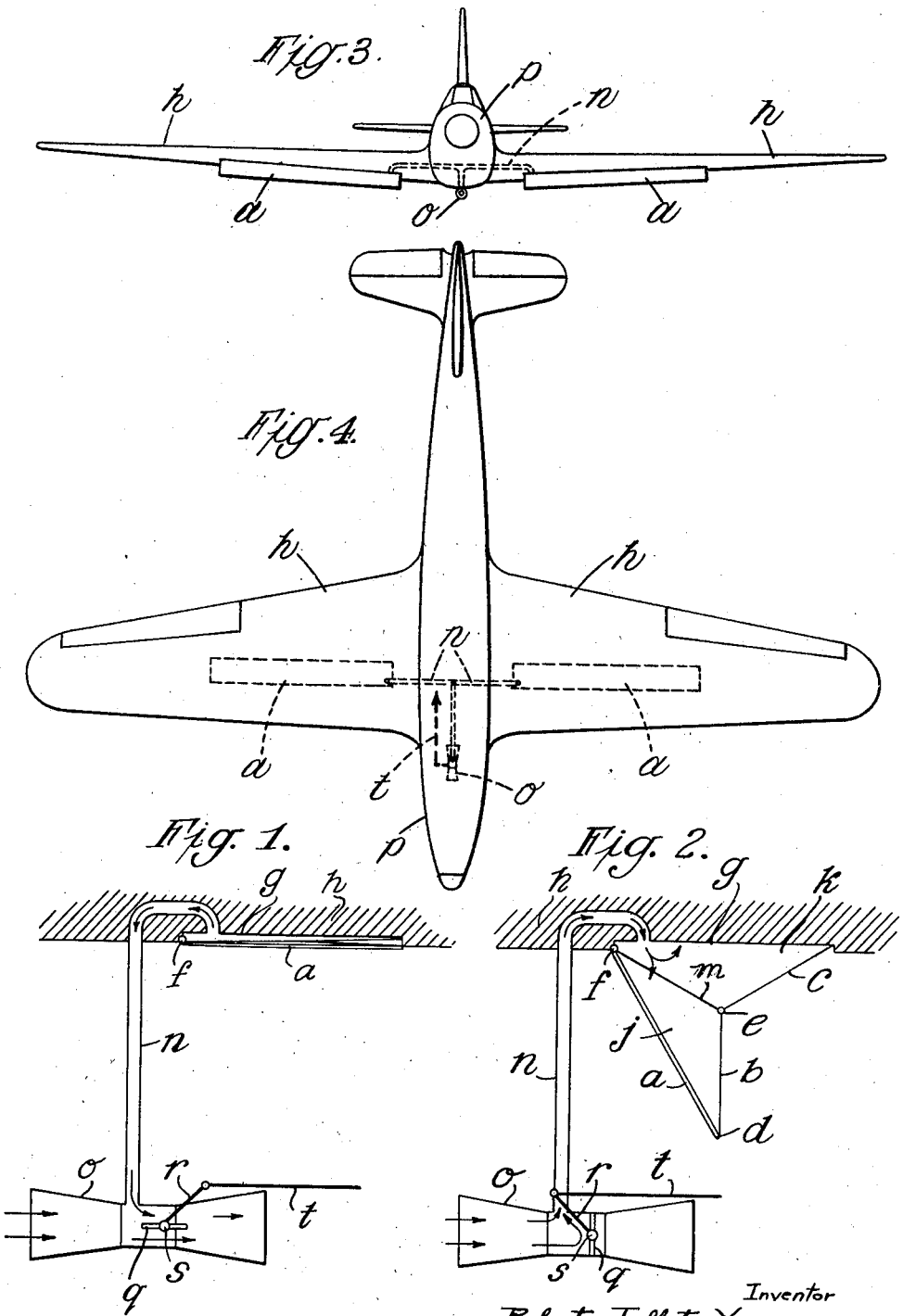
Inventor
Robert Talbot Youngman
By Loyd Hall Sutton
Attorney

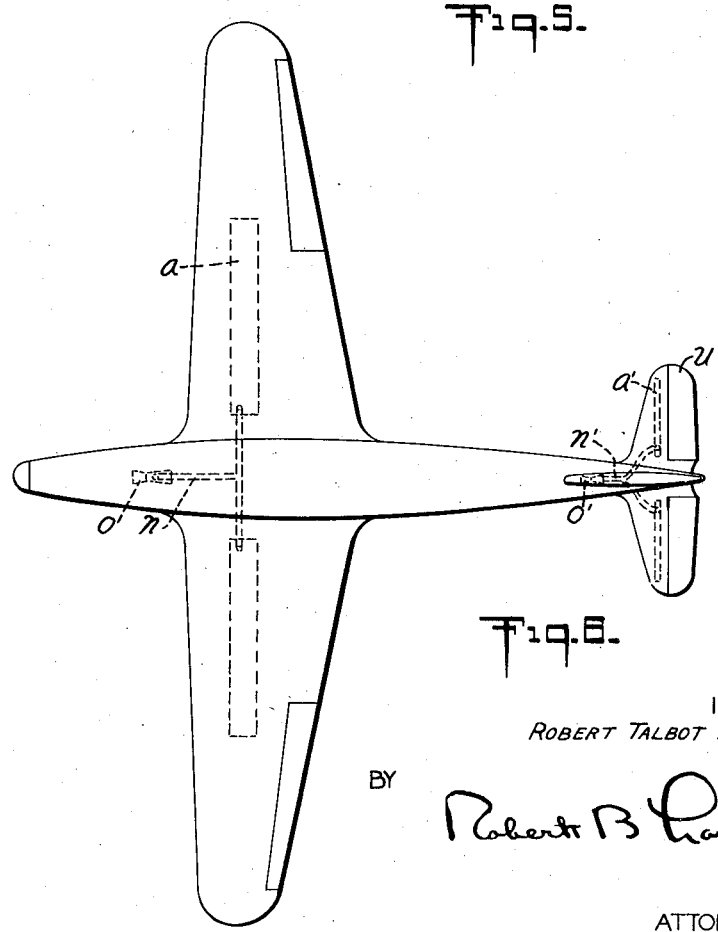

Jan. 8, 1946.  R. T. YOUNGMAN  2,392,443
AIR BRAKE FOR AIRCRAFT
Filed May 11, 1942  3 Sheets-Sheet 3

INVENTOR
ROBERT TALBOT YOUNGMAN
BY
ATTORNEY

Patented Jan. 8, 1946

2,392,443

UNITED STATES PATENT OFFICE 2,392,443

AIR BRAKE FOR AIRCRAFT

Robert Talbot Youngman, Aldershot, England

Application May 11, 1942, Serial No. 442,476
In Great Britain August 8, 1941

3 Claims. (Cl. 244—113)

This invention relates to an air brake for aircraft of the kind comprising a flap or the like which can be projected into the air stream by the extension of a bellows device into which air is driven by the forward movement of the aircraft. In a known device of this kind means are provided for enabling the bellows device to be placed into communication with, or be cut off from communication with, regions of high and also low pressure outside the aircraft, for example, a high pressure region under the wing and a low pressure region above the wing, and these means have been interconnected so that when the one is open the other is closed and vice versa.

In such an arrangement the pressure or suction developed inside the bellows device depends to a large extent upon the incidence of the wing to the relative wind, and, in consequence, the pressure or suction may vary considerably and detract from effective operation. In particular, if the aircraft be inverted the pressure opening may become a suction opening, or pressure may be developed at the suction opening, and this, combined with the outward negative pressure on the flap itself, may inadvertently cause the flap to open, which would possibly result in the aircraft going out of control.

The object of the present invention is to provide a pneumatically operated flap or like movable surface, the opening or closing of which is controlled positively by improved means under all attitudes of flight by dynamic pressure or suction derived from the relative wind.

To this end and in accordance with the invention, the bellows device is connected with a Venturi tube situated in a fore and aft direction in the air stream and connected with said bellows device by a pipe leading thereto from the throat of the Venturi tube, said tube being provided in the rear of said throat with a butterfly shutter or like closing means whereby the opening presented by the Venturi tube may be converted, at the will of the pilot, to a pressure opening, when the shutter is closed, or to a suction opening, when the shutter is open.

The device and the method of operation may be used for the purposes of a lift flap, air brake, trimmer, for any other purpose where it is necessary to move a surface in opposition to the resistance of the relative wind.

By these means it can be made certain that even when the aircraft is in inverted flight, the suction generated in the Venturi tube or the like will always be greater than the negative pressure generated on the outside of the flap when the aircraft is in the inverted attitude, and the flap will accordingly remain closed when the shutter is open. By partially closing the shutter it is also possible to control the angular movement of the flap within predetermined limits.

In such an application of the invention, the air brake may be operated in conjunction with a similar form of flap or trimmer on the tail plane surface for the purpose of counteracting the change of trim when the brake flaps are lowered. This trimmer flap can be connected with the same Venturi tube or it may be controlled independently.

Figure 8:
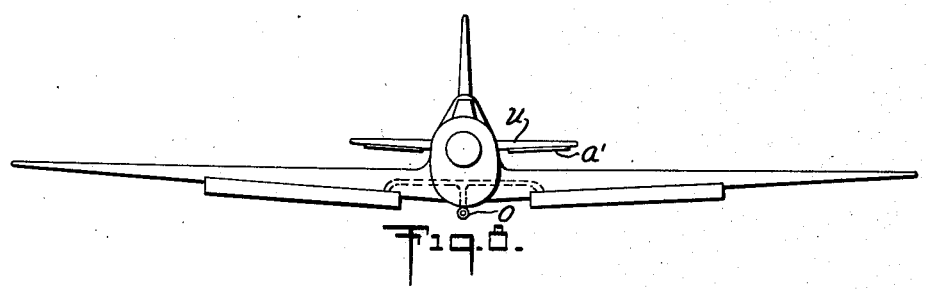
Figure 9:
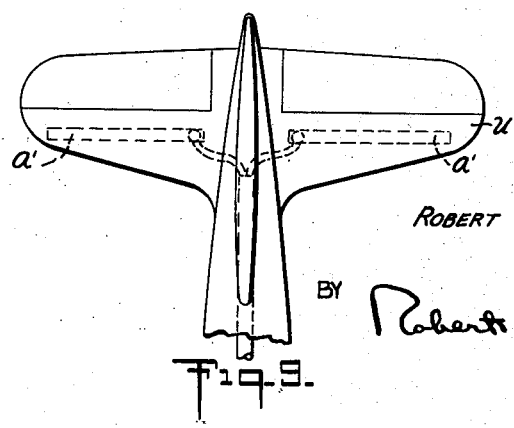

The invention is illustrated by way of example in the accompanying diagrammatic drawings of which Figure 1 shows in fore and aft section a bellows device with a Venturi tube pressure opening, the bellows device being in the collapsed condition; Figure 2 is a similar view showing the bellows device in its extended condition; Figure 3 is a front view and Figure 4 is a plan of an aircraft fitted with air brakes arranged in accordance with the invention; Figure 5 is a side view of a modified construction; Figure 6 is a plan view of the same; Figure 7 is a plan view of a further embodiment; Figure 8 is a front view of the form shown in Figure 7; Figure 9 is an enlarged plan detail of the tail portion of the arrangement shown in Figures 7 and 8; and, Figure 10 shows in fore and aft section the bellows arrangement employed in the embodiment of Figures 7 to 9, inclusive.

As shown the bellows device is constituted by three reinforced plates $a$, $b$ and $c$ covered with fabric and hingedly united as at $d$, $e$, whilst the plate $a$ is hinged as at $f$ at the front end of a recess $g$ in an aircraft wing $h$, it being understood that laterally the bellows device has collapsible side members $j$, $k$ and that suitable sealing strips are provided at the joints. $m$ is a curtain or strip of fabric one end of which is secured at the point $f$, and the other end of which is connected with the junction of the plates $b$ and $c$ at $e$ to limit the extent to which the bellows device can open.

A duct $n$ leads from the interior of the bellows device to the throat of a Venturi tube $o$ situated beneath the fuselage $p$ of the aircraft and having a butterfly shutter $q$ at the rear end of its throat, operable by means of a crank $r$ on its spindle $s$ and a link $t$ leading to the pilot's cockpit.

In use, the Venturi tube $o$ and duct $n$ constitute a pressure opening to the bellows device when said tube is situated in a region of high pressure and the valve $q$ is closed, as indicated in Figure 2, or a suction opening if the valve $q$ be opened, as indicated in Figure 1, thus causing the bellows device to expand or close, whilst if the aircraft be inverted so that the Venturi tube $o$ is situated in a region of low pressure, the valve $q$ if closed at the time of inversion, may be opened so that the bellows device will collapse and be held in its collapsed state as the suction generated in the Venturi tube $o$ will be greater than the negative pressure generated on the outside of the bellows device.

It is to be understood that a diaphragm valve or other suitable device may be substituted for the butterfly valve $q$ and that if desired the valve may be controlled by any convenient electrical, hydraulic or mechanical means.

In the drawings the Venturi tube $o$ is shown fitted at the underside of the fuselage $p$ but it may be fitted in any other suitable position in the air stream.

In Figures 5 to 10, inclusive, are shown two modified forms of the invention in which the air brake is operated in conjunction with a similar form of flap or trimmer on the tail plane surface for the purpose of counteracting the change of trim when the brake flaps are lowered.

In the form shown in Figures 5 and 6 the tail plane $u$ is provided with trimmer flaps $a'$ similar in form and operation to the flaps $a$ of Figures 1 to 4, inclusive. There flaps $a'$ are operated by bellows supplied with air through the duct $u'$ which is connected with the venturi $o'$.

In the form shown in Figures 7 to 10, inclusive, the tail plane is also provided with flaps $a'$ actuated by bellows which are supplied by air through the extension duct $n''$ leading from the duct $n$ connected with the venturi $o$. The operation of both these forms will be obvious from the above description.

I claim:

1. An airbrake for an aircraft comprising a bellows device into which air may be driven by the forward movement of the aircraft, a member operable by said bellows device, said member being projected into the airstream when air is driven into said bellows device, a Venturi tube situated in a fore and aft direction in the airstream, a tube connecting the bellows device with the throat of the Venturi tube, and closing means operable from the pilot's cockpit provided in said Venturi tube in rear of said throat, said Venturi tube constituting a pressure opening when said closing means is adjusted to one position and constituting a suction opening when said closing means is adjusted to a second position, whereby the member operable by said bellows device may be projected or retracted even though inversion of the aircraft may result in inversion of the pressure in the region in which said Venturi tube is situated.

2. An airbrake for an aircraft as claimed in claim 1 in conjunction with a similar device at the surface of the tail plane of the aircraft, both said airbrake and said similar device being connected with the Venturi tube.

3. An air brake for an airplane having wings and a tail plane, said air brake comprising a bellows device into which air may be driven by the forward movement of the airplane, a member carried by the wings and operable by said bellows device, said member being projected into the air stream when air is driven into said bellows device, a Venturi tube situated in a fore and aft direction in the air stream, a tube connecting the bellows device with the throat of the Venturi tube, closing means operable from the pilot's cockpit provided in said Venturi tube in the rear of said throat, said Venturi tube constituting a pressure opening when said closing means is adjusted to one position and constituting a suction opening when said closing means is adjusted to a second position, whereby the member operable by said bellows device may be projected or restricted even though inversion of the airplane may result in inversion of the pressure in the region in which said Venturi tube is situated, a similar member carried by the tail plane, and a similar bellows Venturi tube, connecting tube, and closing means for operating and controlling said similar member.

ROBERT TALBOT YOUNGMAN.